No. 698,576. Patented Apr. 29, 1902.
G. F. SPRAGUE.
THILL COUPLING.
(Application filed Nov. 22, 1901.)
(No Model.)
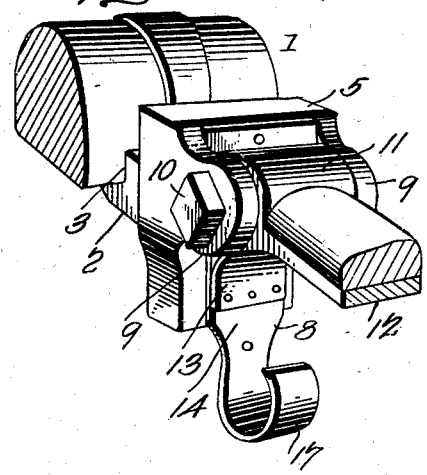
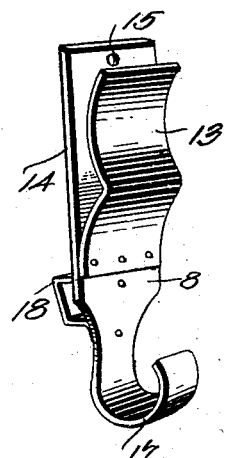
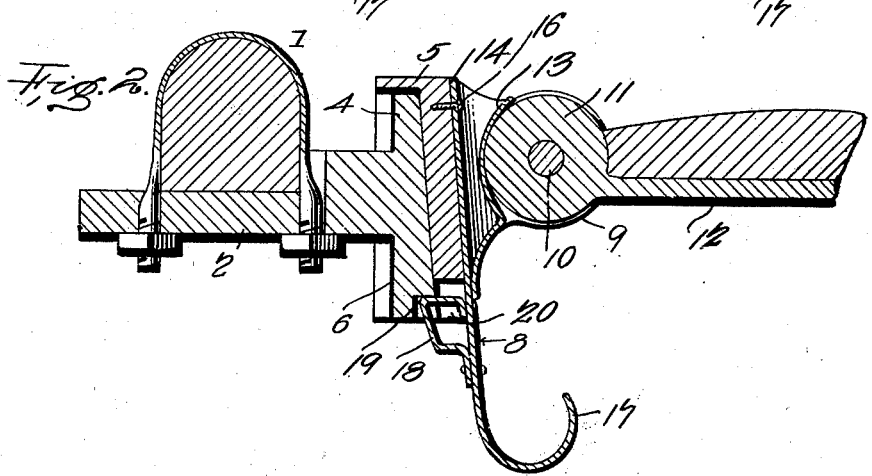
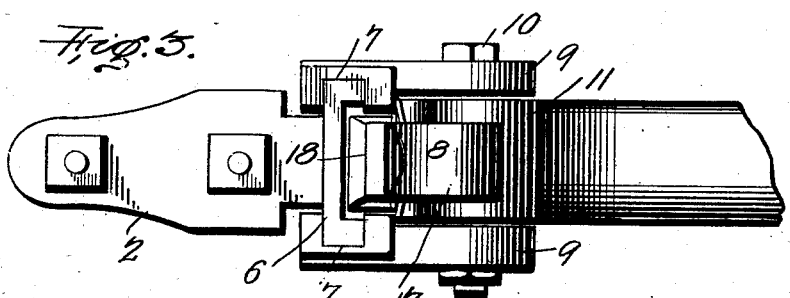
Witnesses
G. F. Sprague, Inventor
by
Attorneys

UNITED STATES PATENT OFFICE.

GEORGE FRANKLIN SPRAGUE, OF GETTYSBURG, PENNSYLVANIA, ASSIGNOR OF ONE-HALF TO S. H. GARRISS, OF PORT JERVIS, NEW YORK.

THILL-COUPLING.

SPECIFICATION forming part of Letters Patent No. 698,576, dated April 29, 1902.

Application filed November 22, 1901. Serial No. 83,322. (No model.)

*To all whom it may concern:*

Be it known that I, GEORGE FRANKLIN SPRAGUE, a citizen of the United States, residing at Gettysburg, in the county of Adams and State of Pennsylvania, have invented a new and useful Thill-Coupling, of which the following is a specification.

The invention relates to improvements in thill-couplings.

The object of the present invention is to improve the construction of thill-couplings, more especially that class in which the thill or shaft iron is mounted on a removable coupling iron or frame that is detachably interlocked with the axle-clip to permit the shafts or thills to be detached without removing the eye or the coupling bolt from its bearings and to provide a simple and comparatively inexpensive thill-coupling in which the antirattler-spring will also operate to lock the coupling iron or frame in engagement with the axle-clip.

A further object of the invention is to provide a thill-coupling of this character in which the combined antirattler and locking spring will be arranged in convenient position to enable it to be readily operated and held out of engagement while the shafts or thills are being lifted or removed from the vehicle.

The invention consists in the construction and novel combination and arrangement of parts hereinafter fully described, illustrated in the accompanying drawings, and pointed out in the claims hereto appended.

In the drawings, Figure 1 is a perspective view of a thill-coupling constructed in accordance with this invention. Fig. 2 is a longitudinal sectional view. Fig. 3 is a reverse plan view. Fig. 4 is a detail perspective view of the combined locking and antirattler spring.

Like numerals of reference designate corresponding parts in all the figures of the drawings.

1 designates an axle-clip having a clip 2, enlarged at its front portion to form a shoulder 3 and provided with an upright lug or plate 4, arranged at the outer end of the enlargement and forming a support for a detachable coupling iron or frame 5. The upright lug, which is arranged at a slight inclination, tapers toward the top and forms a wedge for engaging a tapered recess 6 of the rear face of the coupling iron or frame, and the latter is provided at opposite sides of the recess with grooves 7, forming ways and receiving the side edges of the upright lug. The upright lug terminates short of the upper end of the tapered recess of the coupling iron or plate and is thereby wedged therein, and it is locked in such position by a combined locking and antirattler spring 8. The coupling iron or frame is provided with forwardly-extending perforated ears 9, which form bearings for a coupling-bolt 10, and the latter passes through an eye 11 of a thill or shaft iron 12 in the usual manner; but the thill-iron may be pivoted to the coupling iron or plate in any other suitable manner. The locking-spring, which also serves as an antirattler, is composed of front and rear sides 13 and 14, connected together at the bottom of the coupling iron or plate and interposed between the same and the eye of the thill-iron. The front side 13 of the spring is curved to conform to the configuration of the eye of the thill-iron, and the rear side is straight to fit the back of the coupling iron or plate, and it is located between the perforated ears. The rear side, which is preferably perforated at 15 to receive a suitable fastening device 16 for securing it to the coupling iron or plate, is provided with a depending arm or extension 17, which is curved forward to form a handle or grip and which is adapted to receive the forefinger to enable the spring to be withdrawn from engagement with the lug without releasing the grip on the thill. The operator is adapted to grasp the thill at the rear end and simultaneously insert his finger in the loop or curved portion of the arm 17, and by drawing the spring forward or outward its engaging portion 18 is carried out of engagement with the bottom of the lug. The rear side of the spring is provided with the engaging portion 18, which consists of an approximately rectangular loop, forming a tooth and engaging a recess 19 of the lower end of the lug. The lower end of the back of the coupling iron or plate is also recessed at 20 to permit the engaging portion of the spring to extend into the recess of the lug. The fastening device 16 preferably consists of a screw which is arranged as illustrated in Fig. 2 of the drawings; but the frictional engagement of the spring with the thill-coupling will retain it in the space between the eye of the thill-iron and the back of the coupling iron or plate. The shoulder 3 of the clip-plate fits against the front face of the axle, and the clip-plate is perforated for the reception of the front and rear sides of the axle-clip and is engaged by nuts in the usual manner.

It will be seen that the thill-coupling is exceedingly simple and inexpensive in construction, that the coupling iron or plate is adapted to be readily detached from the lug of the clip-plate, and that the combined antirattler and locking spring is adapted to prevent the parts from rattling and is capable of securely fastening the coupling iron or frame in engagement with the lug. It will also be clear that the depending arm, which is provided with the finger-receiving loop, is adapted to be readily grasped by the operator simultaneously with grasping the thill.

What I claim is—

1. In a device of the class described, the combination of an axle-clip having an upright lug, tapering toward its top, the coupling-iron provided at its back with a tapered recess and having the side walls thereof grooved to receive the lug, whereby the latter is wedged in the coupling-iron, means carried by the coupling-iron for engaging the bottom of the lug, and a thill-iron pivotally connected with the coupling-iron, substantially as described.

2. In a device of the class described, the combination of an axle-clip having an upright lug, a coupling-iron provided with a recess extending upward from its bottom and receiving the lug, said coupling-iron being provided with ears, a thill-iron pivotally mounted between the ears, and the combined antirattler and locking spring composed of sides or arms interposed between the thill-iron and the coupling-iron, and a depending stem forming a handle and provided with a rearwardly-extending loop engaging the bottom of the lug, substantially as described.

In testimony that I claim the foregoing as my own I have hereto affixed my signature in the presence of two witnesses.

GEORGE FRANKLIN SPRAGUE.

Witnesses:
JAS. M. HILL,
WM. P. QUIMBY.